3,049,470
ZINC N-METHYLDITHIOCARBAMATE NEMATOCIDE

Ernst-Albrecht Pieroh, Berlin-Hermsdorf, Horst Werres, Charlottenburg, and Heinz-Eberhard Freund, Berlin-Charlottenburg, Germany, assignors to Schering A.G., Berlin, Germany, a corporation of Germany
No Drawing. Filed Apr. 5, 1960, Ser. No. 19,988
Claims priority, application Germany Apr. 9, 1959
2 Claims. (Cl. 167—22)

This invention relates to a novel composition for the control and destruction of nematodes dwelling in the soil and to the method of application of said composition to nematode infested soil. More particularly, the invention relates to nematocidal compositions which contain as the active ingredient zinc N-methyldithiocarbamate.

It is known that the alkali metal and the alkaline earth metal salts of N-methyldithiocarbamic acid exhibit good nematocidal activity; see for example, U.S. Patent 2,766,554. This has not proved true of other salts of this acid up to now. Several heavy metal salts of N-monosubstituted dithiocarbamic acids are quite unsuitable for this purpose. Thus, for example, the nickel salt of N-methyldithiocarbamic acid is practically without value as a nematocide. Furthermore, other compounds of this type have also proved to be of no value for nematode destruction, such as, for example, tetramethylthiuram disulfide, ferric dimethyldithiocarbamate, manganese ethylene-bis-dithiocarbamate, zinc ethylene-bis-dithiocarbamate, and sodium diethyldithiocarbamate.

It will be apparent from the foregoing that even substances of similar chemical structure and composition can be either very effective or completely worthless for combating nematodes, so thta it is impossible to predict what the nematocidal action of any given compound will be in advance. It follows that for a compound to be a good nematocide, numerous other conditions must be fulfilled, such as low phytotoxicity, development of activity in the soil in a reasonable period of time, good stability on storage, possibility of preparation in solid form, and the like.

It was therefore both surprising and unexpected to find, in accordance with the present invention, that the zinc salt cf N-methyldithiocarbamic acid was an especially effective nematocide. The zinc salt is more effective in its activity than sodium N-methyldithiocarbamate. It has excellent qualities of stability and a very long shelf life, but it decomposes fairly rapidly in the soil and thus does not require too long a period of residence in the soil. Besides this, the zinc salt occurs, as a solid substance and thus may readily be applied in the form of dusting preparations.

The nematocide compositions of the present invention may be applied to nematode infested soil in any of the forms in which nematocides are conventionally prepared for this purpose, either as such in solid form or in parasiticidal amounts in admixture with a solid diluent or carrier, or in solution or suspension in water or organic solvents.

In preparing the novel compositions of this invention, the proportions of the respective components can be varied within wide limits. The particular proportions, which are the most effective in any given application, can be determined by the person skilled in the art in accordance with the extent of kill which it is desired to achieve. It has been found that when admixed with a solid carrier or diluent, for example, the concentration of the zinc N-methyldithiocarbamate will preferably range between about 10% and about 50% by weight of the composition, but in special cases the limits may be extended above or below. The solid inert diluent carrier may be any of such carriers conventionally employed in compositions of this type, such as, for example, fuller's earth or diatomaceous earth, or a mixture of silicates of aluminum, sold commercially under the trademark "Tonsil," iron-aluminum silicates, magnesiumsilicate (talc), and other natural silicates.

The zinc N-methyldithiocarbamate can also be applied in parasiticidal amounts in solutions or suspensions of any desired concentration. The choice of solvents and concentrations is directed toward providing, in the soil to be disinfected, a minimal amount of about 10 g. of zinc N-methyldithiocarbamate per square meter of soil.

When applied in solid form, the preparations of this invention will preferably contain about 20% by weight of the compound in dry ground form. The preparation of the zinc compound can also be applied in the form of a dispersion in water. For the preparations there may be employed suitable wetting agents, emulsifiers, and the like, of which the following examples are given, which are, however, not to be regarded as limiting: such on basis of alkylphenolpolyglycol ethers, with a medium degree of hydroxyethylation, a fatty acid polyglycol ester, polyoxyethylene sorbitan monooleate, or sulfonated oil with polyoxyethylene sorbitol ester.

The amount of active ingredient which is to be brought in contact with the infested soil will preferably lie between about 10 g. and about 50 g. per square meter of soil, depending upon the degree of infestation of the soil, the type of nematodes to be destroyed, the extent of kill desired, and the like. Accordingly, it will be understood that the foregoing limits are subject to variation depending upon conditions.

The following tests serve to illustrate the effectiveness of the novel nematocidal compositions of this invention.

EXAMPLE 1

*Laboratory tests.*—A nematocidal composition was prepared by grinding together zinc N-methyldithiocarbamate with an aluminum silicate inert carrier ("Tonsil"), the active ingredient comprising 20% by weight of composition. The quantities given in the following table of this composition were mixed with 1 liter of soil. The soil moisture was 23%, the soil temperature was 19–20° C. The test nematodes were *Aphelenchoides ritzemabosi* (Schwartz) and *Ditylenchus dipsaci* (Kühn). Evaluations were made after a period of action of 20 and 40 hours. The number of killed nematodes is given in percent in the following table:

*Table 1*
ACTIVITY OF ZINC N-METHYLDITHIOCARBAMATE

| Concentration Active Material per liter of soil | Aphelenchoides, percent killed after— | | Ditylenchus, percent killed after— | |
|---|---|---|---|---|
| | 20 hrs. | 40 hrs. | 20 hrs. | 40 hrs. |
| 40 mg | 100 | 100 | 100 | 100 |
| 30 mg | 100 | 100 | 100 | 100 |
| 20 mg | 70 | 100 | 50 | 100 |
| 10 mg | 50 | 95 | 50 | 80 |

EXAMPLE 2

*Greenhouse tests.*—A nematocidal composition prepared as in Example 1 was introduced into soil which was infested by the rootknot nematode, Meloidogyne sp. (Chitwood). After an idle time of eight days, tomato seeds were introduced into the treated soil, and a cultivation period of 30 days followed, after which an evaluation was made of the nematocidal action in terms of the number of rootknot occurrences on the roots, corresponding to the number of nematodes per root. A comparison test was run using an aqueous preparation of sodium N-methyldithiocarbamate. The results of these tests are shown in Table 2.

*Table 2*

| Concentration Active Material Per Liter of Soil | 1. Zinc N-methyldithio-carbamate, percent Kill | 2. Sodium N-methyldithio-carbamate, percent Kill |
|---|---|---|
| 40 mg | 96 | 68 |
| 60 mg | 98 | 75 |
| 80 mg | 100 | 97 |
| 100 mg | 100 | 100 |

EXAMPLE 3

A preparation was made by mixing the following compounds

20% zinc N-methyldithiocarbamate
79% of an inert solid carrier on basis of an iron alumium-silicate, known under the trade name of "Tonsil"
1% of an emulsifier on basis of sulphonated amides of higher fatty acids (trade name "Hostapon")

The well mixed compounds were ground and are then ready to be used as a dusting powder in quantities of 100 g./m.$^2$ against free living nematodes and rootknot nematodes.

Although a dry application as described foregoing is preferred, it may also be applied with good results in the form of a dispersion in water, or in other known preparations.

We claim:

1. Method for controlling soil dwelling nematodes which comprises impregnating nematode infested soil with a parasiticidal amount of solid zinc N-methyldithiocarbamate.

2. Method for controlling soil dwelling nematodes which comprises impregnating nematode infested soil with a parasiticidal amount of zinc N-methyldithiocarbamate and an inert diluent as a carrier therefor.

References Cited in the file of this patent

UNITED STATES PATENTS

| | | |
|---|---|---|
| 1,972,961 | Tisdale | Sept. 11, 1934 |
| 2,457,674 | Heuberger | Dec. 28, 1948 |
| 2,766,554 | Dorman | Oct. 16, 1956 |
| 2,791,605 | Dorman | May 7, 1957 |
| 2,797,181 | Drexel | June 25, 1957 |
| 2,929,758 | Buckman | Mar. 22, 1960 |